United States Patent
Kinoshita (10) Patent No.: US 6,363,068 B1
(45) Date of Patent: Mar. 26, 2002

(54) BRIDGE AND METHOD OF IMPROVING TRANSMISSION EFFICIENCY OF THE SAME

(75) Inventor: Hiroyuki Kinoshita, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/098,907

(22) Filed: Jun. 17, 1998

(30) Foreign Application Priority Data

Jun. 18, 1997 (JP) .............................................. 9-160717

(51) Int. Cl.[7] .............................................. H04L 12/28
(52) U.S. Cl. ........................ 370/389; 370/401; 370/408
(58) Field of Search ................................ 370/389, 390, 370/392, 400, 401, 402, 403, 404, 406, 408

(56) References Cited

U.S. PATENT DOCUMENTS

| | | |
|---|---|---|
| 5,150,360 A | 9/1992 | Perlman et al. |
| 5,220,562 A | 6/1993 | Takada et al. |
| 5,844,902 A | * 12/1998 | Perlman |

* cited by examiner

Primary Examiner—William Luther
(74) Attorney, Agent, or Firm—Ostrolenk, Faber, Gerb & Soffen, LLP (57) ABSTRACT

A bridge that can effectively use plural paths by restricting a single path by a spanning tree algorithm, thus preventing that a broadcast packet is circulated in a looped communication path when two neighbor brides configuring a spanning tree are physically connected with plural paths. The bridge incorporates a correspondence table for the correspondence between the transmission source Mac address and the transmission destination port of a packet. A transmission source Mac address registration section decides the transmission destination port of a packet to be transmitted from the port to other bridge. The transmission destination port is cataloged on the table. When the transmission packet is a broadcast packet or BPDU packet, it is divided to a specific port among ports of the bridge. Other packets are divided to the corresponding ports by referring to the content cataloged on the table. Thus all the paths can be effectively used.

11 Claims, 8 Drawing Sheets

TRANSMISSION SOURCE Mad address TO TRANSMISSION
DESTINATION PORT CORRESPONDENCE TABLE 1340

| TRANSMISSION SOURCE Mac address | TRANSMISSION DESTINATION PORT | aging time |
|---|---|---|
| Mac address OF TERMINAL 4 | 11 | 0 |
| Mac address OF TERMINAL 5 | 12 | 10 |

FIG.4 (B)

TRANSMISSION SOURCE Mac address TO TRANSMISSION
DESTINATION PORT CORRESPONDENCE TABLE 1340

| TRANSMISSION SOURCE Mac address | TRANSMISSION DESTINATION PORT | aging time | TRAFFIC |
|---|---|---|---|
| | | | |

| PORT | Mac address |
|---|---|
| 83 | Mac address OF 5 |
| 84 | Mac address OF 5 |
| 81,82 | Mac address OF 7 |
| 81.82 | Mac address OF 8 |

| PORT | Mac address |
|---|---|
| 93 | Mac address OF 7 |
| 94 | Mac address OF 8 |
| 91,92 | Mac address OF 5 |
| 91.92 | Mac address OF 6 |

BRIDGE AND METHOD OF IMPROVING TRANSMISSION EFFICIENCY OF THE SAME

BACKGROUND OF THE INVENTION

The present invention relates to a bridge, and more particularly to a bridge which configures a spanning tree and is connected to neighbor bridges via plural paths. The present invention also relates to a method of improving the transmission efficiency of a bridge.

In order to avoid the looping of a packet in a conventional bridge, only one logical path is decided by setting ports of each bridge in a forwarding or blocking state by a spanning algorithm when plural paths configured by bridges exist within the same broadcast domain.

That is, when plural LANs (Local Area Networks) are interconnected in a loop state by bridges, broadcast packets are continuously relayed by each bridge without disappearance. However, when the number of packets to be relayed increase, the network is finally filled with them, thus resulting in a disabled state.

The spanning tree protocol compliant with the IEEE 802.1D standard is used to avoid such a condition. The spanning tree protocol is used to configure a tree configuration by logically separating off a looped communication line at a point.

Under the spanning tree protocol, bridges exchange a control packet being a BPDU (Bridge Protocol Data Unit) with each other. Thus a root bridge, being the apex of the spanning tree protocol, is decided based on ID, or identification information, inherent to a bridge. The root bridge periodically transmits a BPDU packet. When a bridge receives the BPDU packet, it transmits the same to a bridge which is downstream in the spanning tree.

Figure 8:
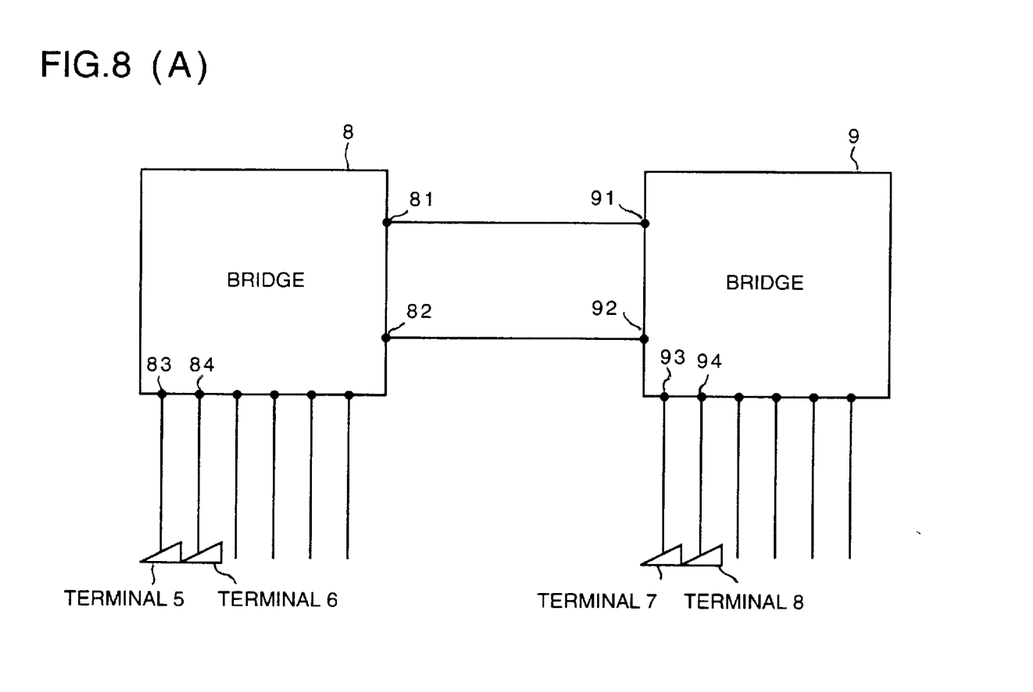
FIG. 8(A) is a block diagram illustrating a conventional arrangement including bridges.
FIG. 8(B) is a conventional bridge table which includes ports and Mac addresses cataloged.

As shown in FIG. 8(A), when there are plural paths between bridges 8 and 9, (e.g. two paths including one connected between ports 81 and 91 and the other connected between ports 82 and 92), only one path is selected by the spanning tree algorithm.

In this case, the bridge 8 controls the ports 81 and 82 while the bridge 9 controls the ports 91 and 92. Bridging is accomplished between the ports by creating the bridge table shown in FIG. 8(B) to handle as one logical port the two ports which physically exist. This allows packets to be freely transmitted to plural paths.

FIG. 8(B) shows a bridge table. A Mac address represents a Media Access Control address of the Data-Link Layer, or a terminal inherent address.

The conventional bridging technique has the disadvantage in that since only one path is selected among plural paths between bridges, any packet cannot be transmitted through the remaining paths.

The spanning tree specified by the IEEE standard, and so forth exists as means of preventing a broadcast stream from occurring because of the presence of plural paths between bridges. However, this algorithm restrictedly selects a single path when plural paths exist.

Moreover, the problem is that two bridges must provide the same function to use the paths therebetween.

The reason is that the general learning bridge causes the broadcast storm when only one bridge transmits packets via plural paths to transmit unknown Mac address or broadcast addresses to all ports.

SUMMARY OF THE INVENTION

The objective of the present invention is to solve the above-mentioned tasks.

Moreover, the objective of the invention is to provide a bridge capable of effectively utilizing plural paths connecting the bridge to neighbor bridges to communicate with the neighbor bridges, thus improving the transmission efficiency.

Furthermore, the objective of the present invention is to provide a method of improving the transmission efficiency of a bridge.

The objective of the present invention is achieved by a bridge which configures a spanning tree and is connected to neighbor bridges via plural paths, comprising a storage table for storing a pair of a transmission source address of a receive packet and a transmission destination port of the packet; a transmission destination decision registering means for deciding the transmission destination port by the transmission source address of the receive packet and then registering the transmission destination port on the storage table; and a transmission packet dividing means for transmitting packets from a specific port among ports corresponding to said plural paths when packets to be transmitted to the plural paths are broadcast packets or BPDU (Bridge Protocol Data Unit) packets of the spanning tree and for referring to the storage table when the packets to be transmitted to the plural paths are not broadcast packets or BPDU packets and then transmitting the packets to a corresponding transmission destination port.

In the bridge according to the present invention, the transmission source address on the storage table stores aging time information representing a registration elapse time; and the transmission source port on the storage table stores aging time information representing a registration elapse time; and the transmission packet dividing means resets corresponding aging time information upon referring to the storage table.

According to the present invention, the bridge further comprises received packet dividing means for receiving a BPDU packet and a broadcast packet and then transmitting them to the next stage, the BPDU packet and the broadcast packet being transmitted from the specific port among the ports respectively corresponding to the paths.

In the bridge according to the present invention, the received packet dividing means refers to the storage table according to the transmission destination address of the received packet from a port corresponding to each of the paths and then discards the received packet when the corresponding transmission destination port differs from a receive port.

In the bridge according to the present invention, the received packet dividing means refers to the storage table according to the transmission destination address of the received packet from a port corresponding to each of the paths and then discards the received packet when the corresponding transmission destination port is the same as a receive port and said transmission source address is registered on the storage table and information on the corresponding aging time registered on the storage table is smaller than a predetermined time.

In function, path division is decided for each Mac address of a transmission source to plural paths between the bridge according to the present invention and a general learning bridge. A port which transmits and receives a BPDU packet or broadcast packet in a spanning tree is selected as a specific port among plural paths. Thus, traffic can be distributed to plural paths while the spanning tree is being used.

Moreover, according to the present invention, a method of improving the efficiency of a bridge which configures a spanning tree and is connected to neighbor bridges via plural paths, comprises the steps of storing a pair of a transmission source address of a receive packet and a transmission destination port of the packet into a storage table; deciding the transmission destination port by the transmission source address of the receive packet and then registering the transmission destination port on the storage table; and transmitting packets from a specific port among ports corresponding to the plural paths when packets to be transmitted to the plural paths are broadcast packets or BPDU (Bridge Protocol Data Unit) packets of the spanning tree and for referring to the storage table when the packets to be transmitted to the plural paths are not broadcast packets or BPDU packets and then transmitting the packets to a corresponding transmission destination port.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Embodiments according to the present invention will be described in detail with reference to the attached drawings.

Figure 1:
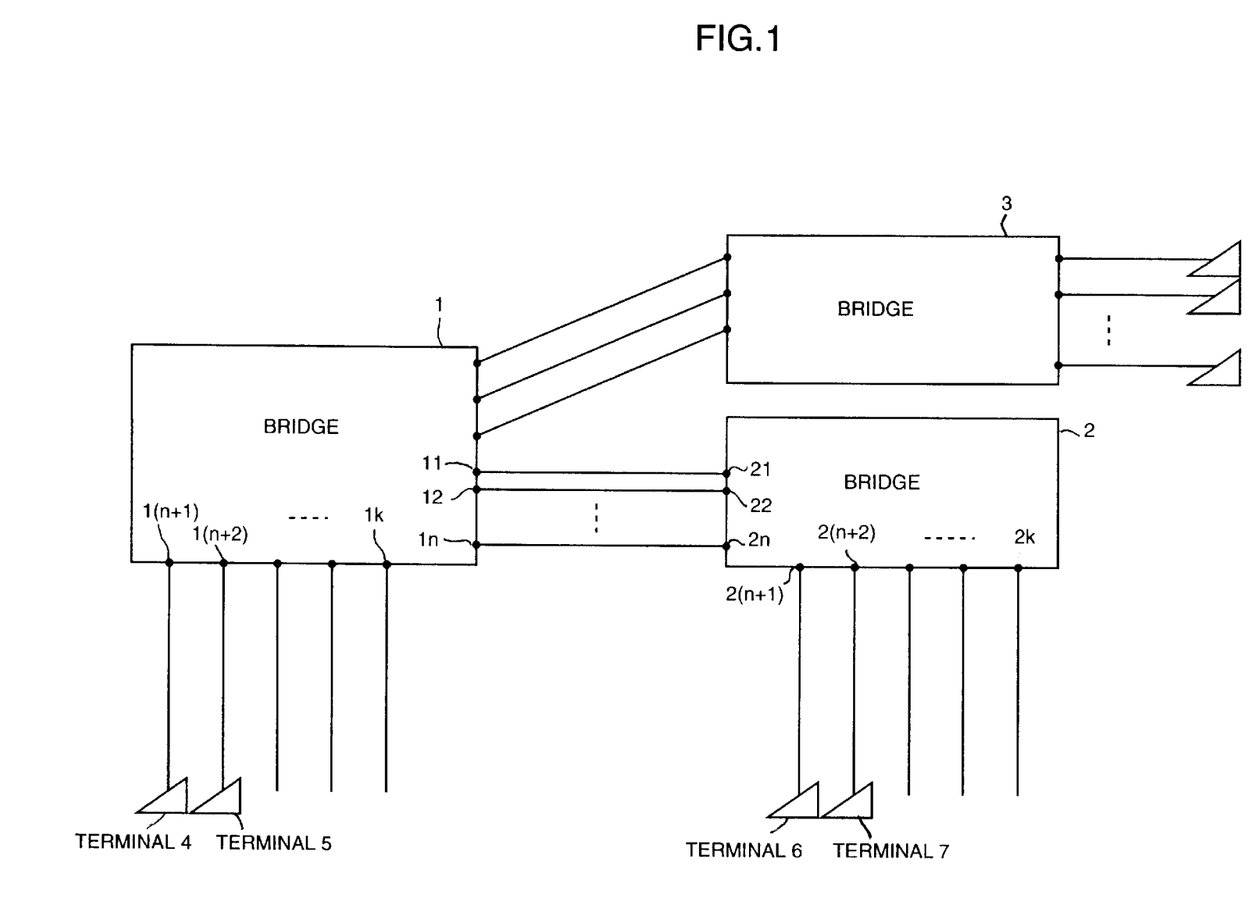
FIG. 1 is a block diagram illustrating a network including a bridge according to the present invention.

FIG. 1 is a block constitution diagram illustrating a system including a bridge according to the present invention. Referring to FIG. 1, a bridge 1 is physically connected to neighbor bridges 2 and 3 via plural paths. The ports 11, 12, and in of the bridge 1 are respectively connected to the ports 21, 22, and 2n of the bridge 2.

In the bridge 1, the ports 1(n+1) to 1k are respectively connected to the terminals (4 or 5). In the bridge 2, the ports 2(n+1) to 2k are respectively connected to the terminals (6 or 7).

Figure 2:
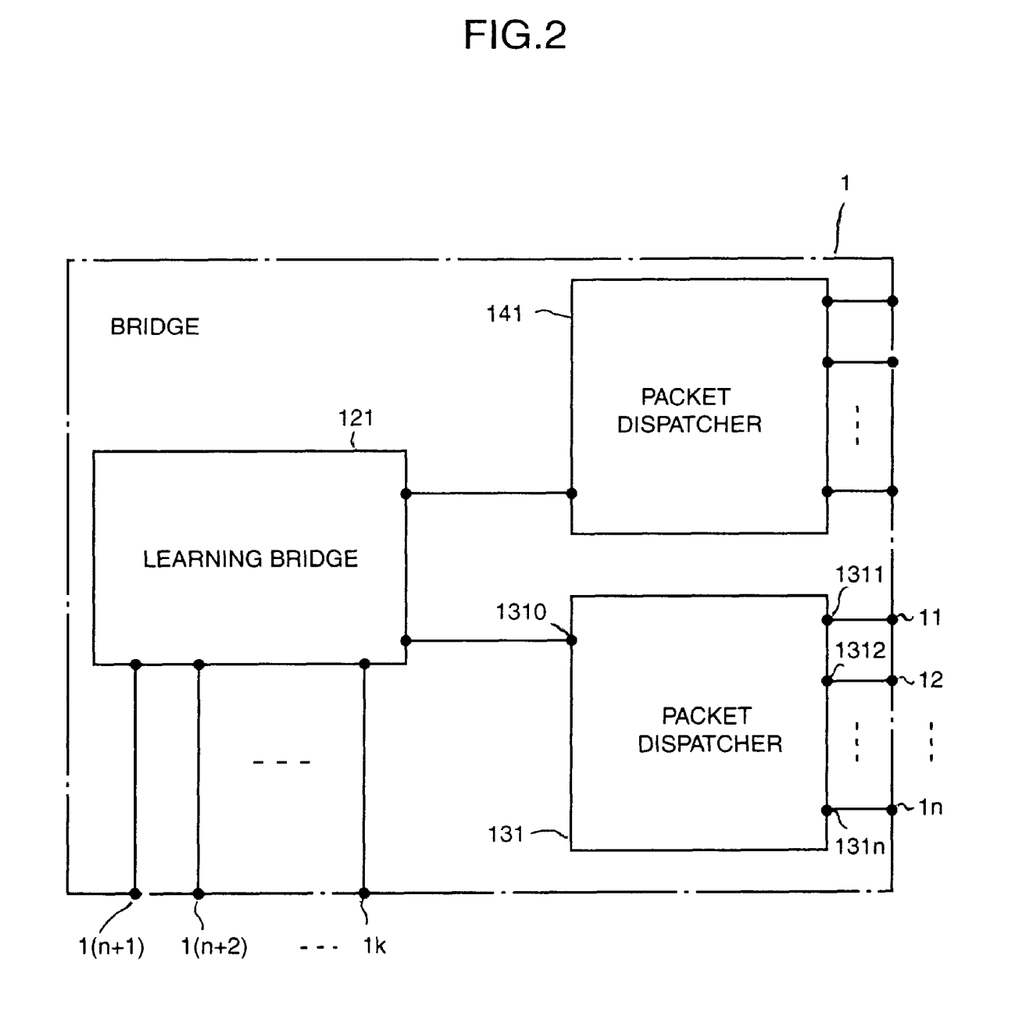
FIG. 2 is a block diagram illustrating a bridge according to an embodiment of the present invention.

Referring to FIG. 2, the bridge 1 includes a learning bridge section 121, a packet dispatcher 131, network ports 11 to in, and networks 1(n+1) to 1k. One of the network ports 11 to in is a typical port which transfers a broadcast packet and a multicast packet.

The learning bridge section 121 is connected to the network ports 1(n+1) to 1k and the packet dispatcher 131 and provides the function of receiving packets from respective ports, learning by registering transmission source addresses onto a bridge table like the conventional learning bridge, and transmitting a packet from the bridge table to a corresponding port.

Figure 3:
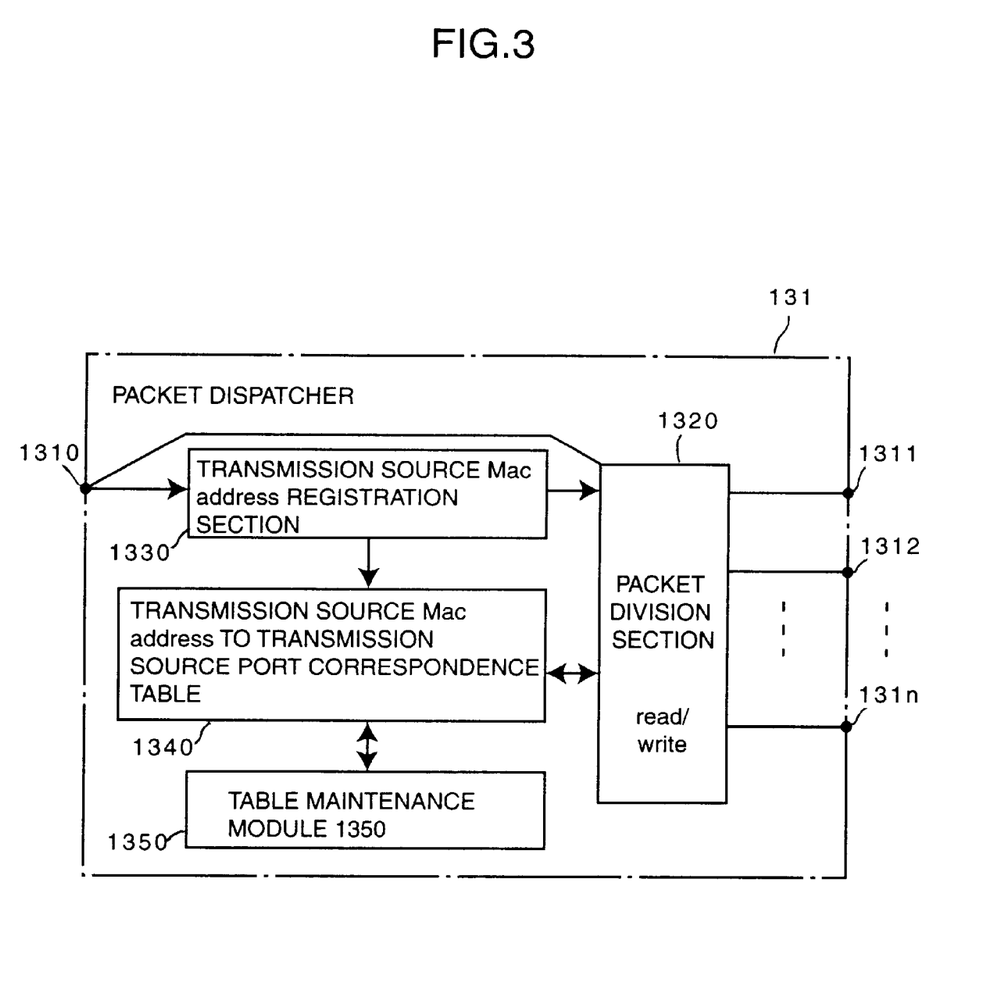
FIG. 3 is a block diagram illustrating the configuration of a packet dispatcher according to an embodiment of the present invention.

Referring to FIG. 3, the packet dispather 131 includes a packet dividing section 1320, a transmission source Mac address registration section 1330, a transmission source Mac address to transmission destination port correspondence table 1340, and a table maintenance module 1350. The transmission source Mac address registration section 1330 has the function of writing the transmission source Mac address of a packet received by the port 1310 into the transmission source Mac address to transmission destination port correspondence table 1340.

The packet dividing section 1320 has the function of referring to the transmission source Mac address to transmission destination port correspondence table for a packet sent from the port 1310, then transmitting the packet to a suitable one of the network ports 1311 to 131n, and transmitting the packet to the port 1310 connected to the learning bridge section 121. The table maintenance module 1350 has the function of deleting an entry with an aging time over a life time among entries stored in the transmission source Mac address to transmission designation port correspondence table 1340.

The configuration of the bridge 1 will be next described in detail here. FIG. 2 is a block diagram illustrating the configuration of a bridge according to an embodiment of the present invention. The learning bridge section 121 has the same function as the conventional learning bridge. That is, the learning bridge 121 receives respective packets from the network ports 1(n+1) to 1k and packets from the port 1310 of the packet dispatcher, learns the transmission source Mac address based on the received packets in relation to the receive ports, and then transmits the packets to the ports at which destination Mac addresses exist by referring the learned table.

The configuration of the packet dispatcher 131 will be described by referring to FIG. 3. The packet dispatcher 131 consists of a packet dividing section 1320, a table maintenance module 1350, a transmission source Mac address registration section 1330, a transmission source Mac address to transmission destination port correspondence table 1340, a connection port 1310 to the learning bridge section 121, and network ports 1311 to 131n.

The transmission source Mac address registration section 1330 has the function of learning the transmission source address of a packet received by the port 1310 and managing the writing operation to the transmission source Mac address to transmission destination port correspondence table 1340.

The packet dividing section 1320 has the function of transferring packets received via the network ports 1311 to 131n to the port 1310 and distributing the packet from the port 1310 to the network port 1311 to 131n. Packets are divided onto the ports 1311 to 131n by retrieving the transmission source Mac address to transmission destination port correspondence table 1340 using as a key the transmission source Mac address of a packet and deciding the transmission destination port. When the transmission destination port is not registered to the table 1340, the transmission destination port is decided based on the status and the transmission destination rate of the network port, and so on.

Figure 4A:
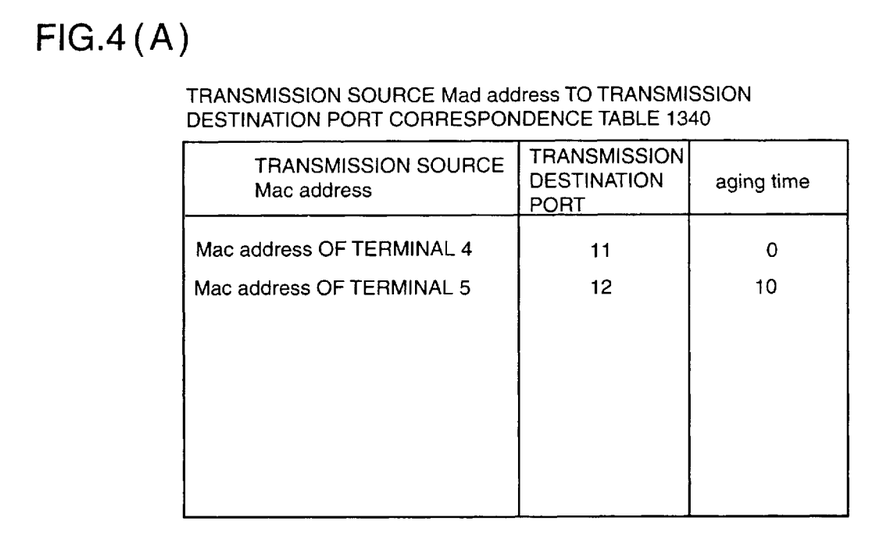
FIG. 4(A) shows a transmission source Mac address to transmission destination port correspondence table.

The transmission source Mac address to transmission destination port correspondence table 1340 is formed of parameters including transmission source Mac address, transmission destination port, and aging time, as shown in FIG. 4(A). The transmission source Mac address registration section 1330 stores the transmission source Mac address. The packet dividing section 1320 decides and updates the transmission destination ports and aging time.

The table maintenance module 1350 has the function of retrieving an entry to the transmission source Mac address to transmission destination port correspondence table by an aging time key and then deleting entries of which the lifetime has elapsed.

The operation of the bridge 1 will be next described with reference to FIG. 1. The bridge 1 is a bridge according to the present invention. The bridges 2 and 3 are conventional learning bridges, respectively. The bridge 1 is directly connected to the bridge 2 at the ports 11 to 1n. The bridge 1 is also connected to the bridge 3 at plural ports.

Referring to FIG. 2, the learning bridge section 121 receives packets received by way of the ports 1(n+1) to 1k of the bridge 1 as well as packets received from the ports 11–1n by way of the packet dispatcher 131.

The learning bridge section 121 operates like the conventional learning bridge. Combinations of the transmission source Mac address of a received packet and a port are stored onto the bridge table. Next, when an entry to a corresponding Mac address is found by referring to the bridge table, the transmission destination Mac address is transmitted to only the corresponding port. When the transmission destination Mac address is a broadcast or an unregistered Mac address, the transmission destination Mac address is transmitted to all the remaining ports other than the received port. The learning bridge section 121 handles the connection port 1310 to the packet dispatcher 131 as one of the network ports, the transmission destination Mac address is also transmitted to the packet dispatcher 131.

The operation of the packet dispatcher 131 will be described below by referring to FIG. 3.

The packet dividing section 1320 receives receive packets input through the network ports 11 to 1n and receive packets from the learning bridge section 121 via the port 1310. The transmission destination Mac address registration section 1330 operates according to the flow chart shown in FIG. 5.

Figure 5:
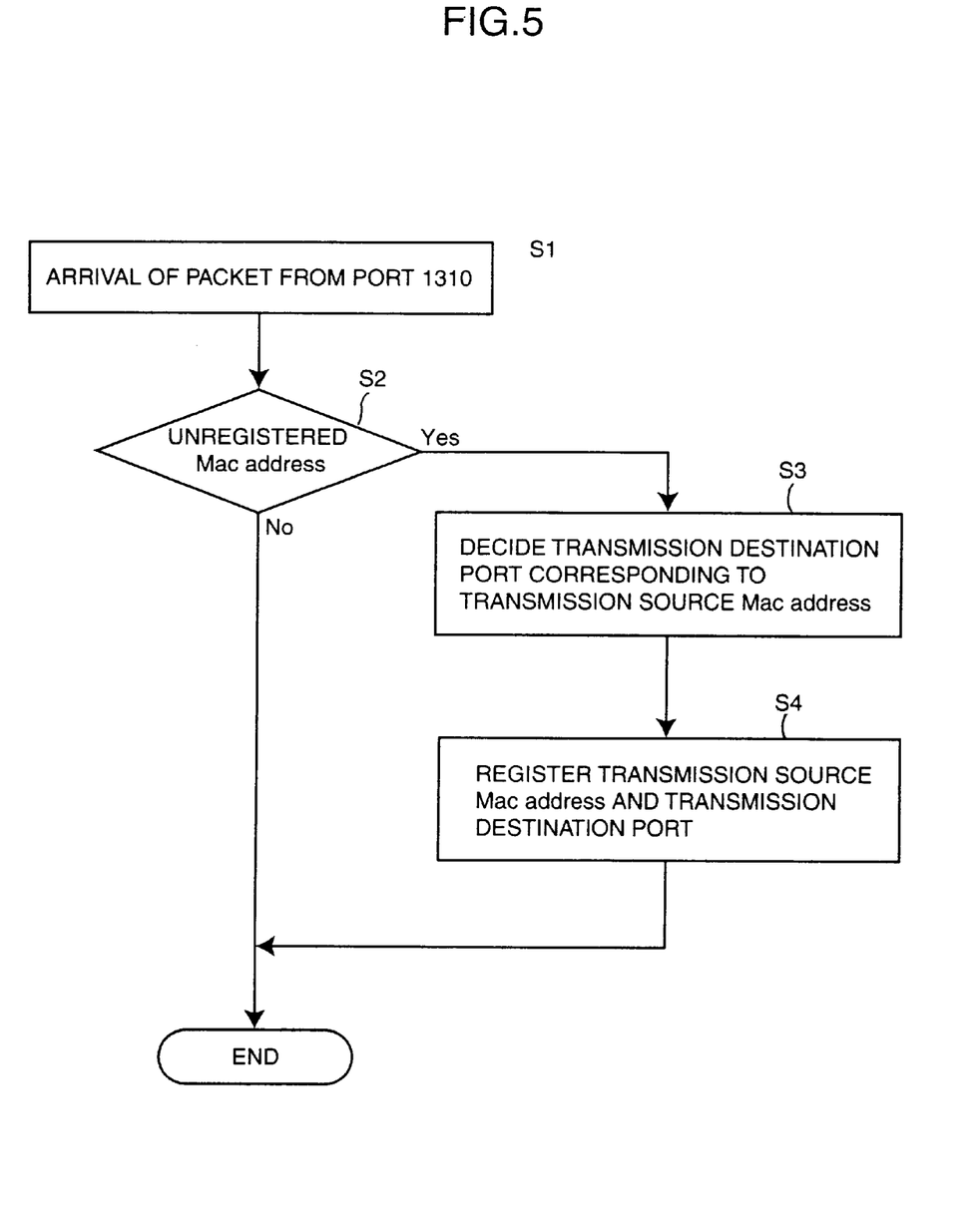
FIG. 5 is a flowchart illustrating the operation of the transmission source Mac address registration section 1330.

Specifically, When the transmission destination Mac address of the packet (S1) received via the port 1310 is not cataloged on the table 1340, the transmission destination Mac address registration section 1330 decides the transmission destination port corresponding to the transmission source Mac address (S3). At this time, the transmission destination port corresponds to a most vacant port by judging the use ratio of each port based on port statistics information such as MIB Management Information Base) information. Transmission source Mac addresses and transmission destination ports are cataloged in a correspondence relationship onto the table 1340 (S4).

Figure 6:
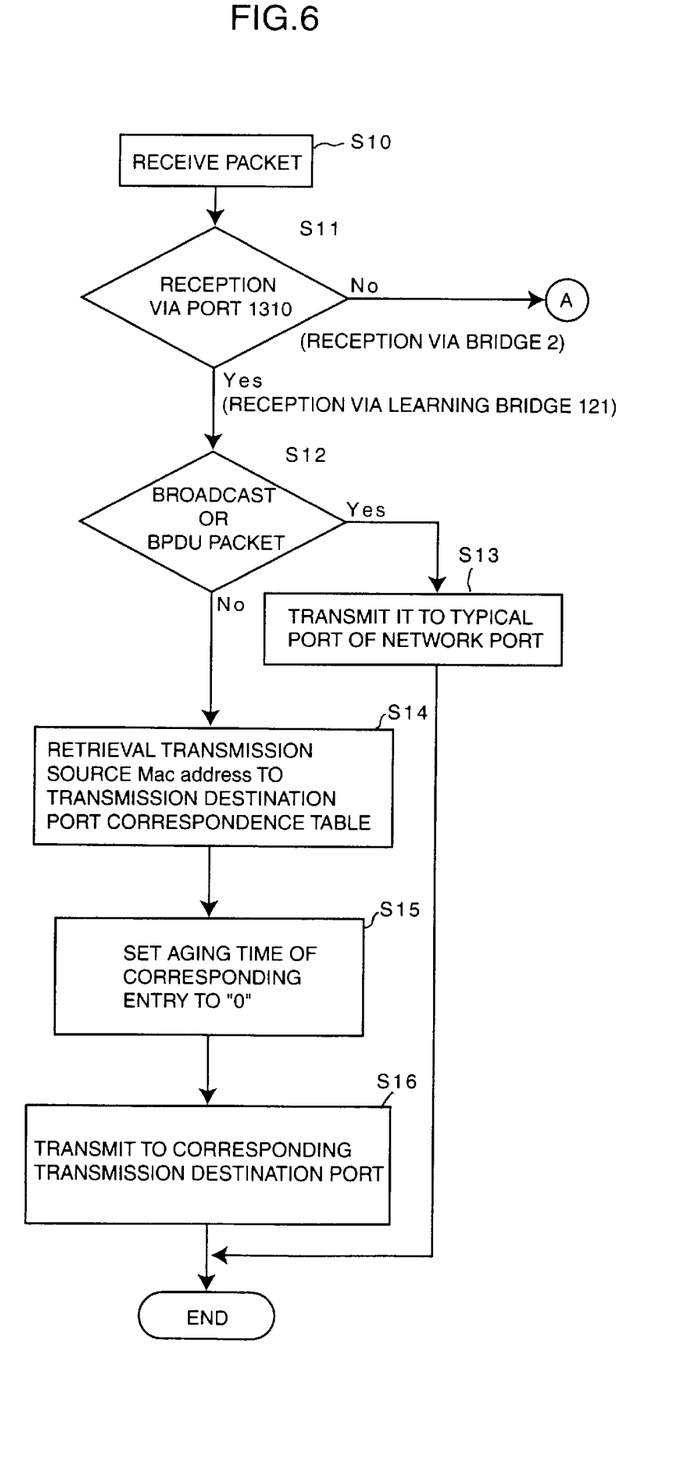
FIG. 6 is a flowchart illustrating the operation of the packet dividing section 1320.
Figure 7:
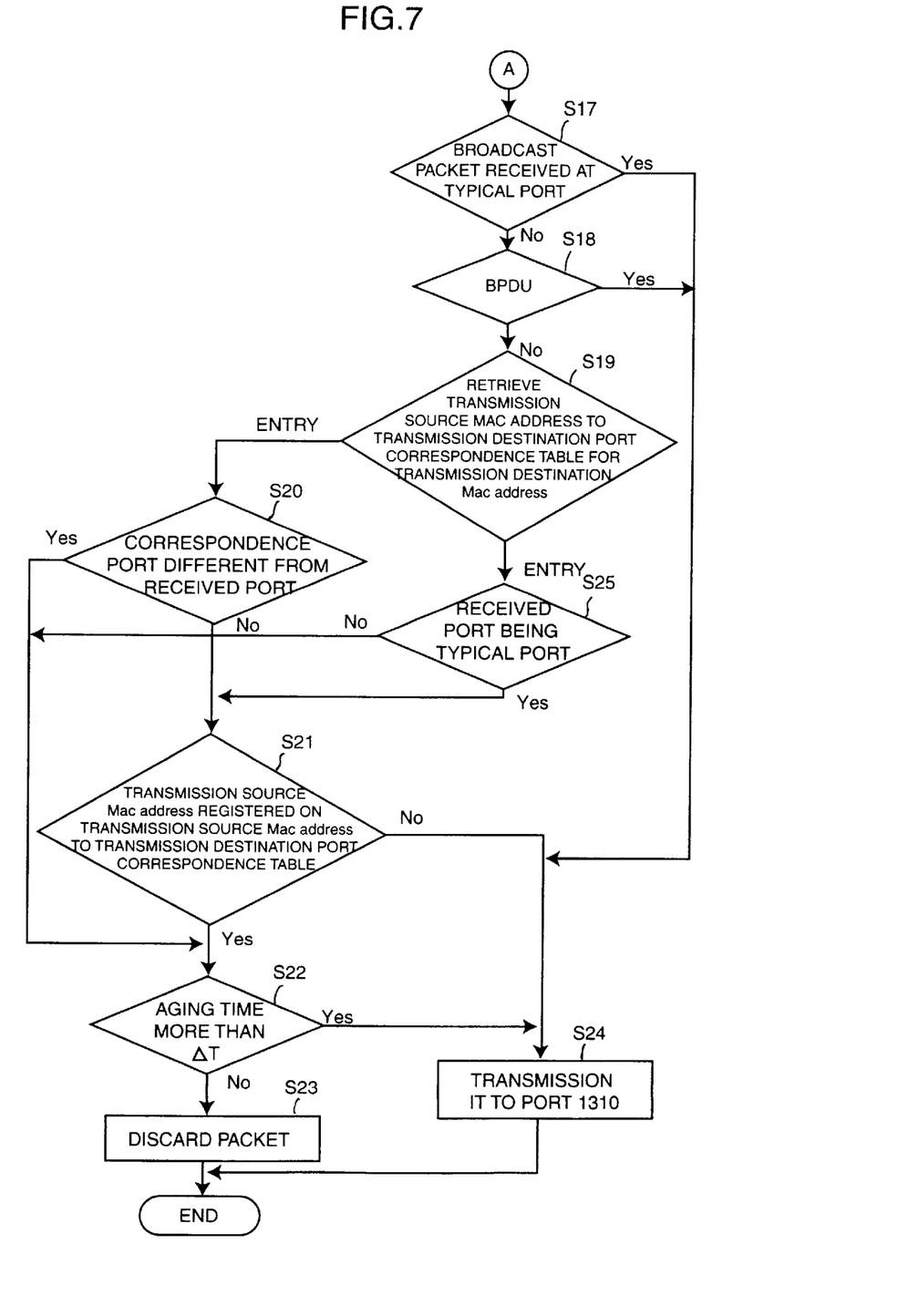
FIG. 7 is a flowchart illustrating the operation of the packet dividing section 1320.

Each of FIGS. 6 and 7 is a flow chart illustrating the operation of the packet dividing section 1320. In response to a packet from the learning bridge section 121 via the port 1310 (S10 and S11), the packet dividing section 1320 judges whether the packet is a broadcast packet or a BPDU packet used for a spanning tree (S12). When the received packet is a broadcast or BPDU packet, the packet dispatcher 1320 transmits it to only a typical port among the network ports 11 to 1n (S13).

If not so, the packet dividing section 1320 retrieves the transmission source Mac address to transmission destination port correspondence table 1340 by the transmission source address of a receive packet as a key (S14). Since the transmission source address is registered by the transmission source Mac address registration section 1330, the corresponding entry exists. The corresponding entry is transmitted to the transmission destination port (S16). At the same time, the aging time of the entry is set to zero (S15).

When receiving packets from the network ports being ports except the port 1310 (S11), that is, the port of the learning bridge section 121, the packet dividing section 1320 checks whether the received packet is a broadcast packet from the typical port (S17) or a BPDU packet (S18). If the two checking conditions are yes, the packet is transmitted to the port 1310 (S24).

When decision is no in the steps S17 and S18, the lifetime of the transmission source Mac address to transmission destination port correspondence table is set to a larger value than the lifetime of the bridge table in the bridge 2, by considering that the bridge 2 transfers a received packet as an unknown Mac address. It is checked whether the transmission source Mac address is an address registered on the transmission source Mac address to transmission destination port correspondence table 1340 (S19). When the transmission source Mac address is not registered while the receive port is not a typical port (S25), the packet is discarded (S23). A received port corresponds to another port. If the received port is not the port which does not correspond to the transmission destination Mac address (S20), the packet is discarded (S23).

In other cases, it is retrieved whether the transmission source Mac address of a received packet is registered onto the transmission source Mac address to transmission destination correspondence table 1340 (S21). If the transmission source Mac address is not registered, the packet is transmitted to the port 1310 (S24). If the transmission source Mac address is registered, the aging time is checked (S22). When the aging time is more than $\Delta t$, the corresponding entry is deleted while the packet is transmitted to the port 1310 (S24). If not so, the packet is discarded (S23).

The checking operation (S21) for the transmission source Mac address of a received packet output from the network port is performed to check whether the received packet is a packet looped back from the bridge 2. Normally, when the received packet is looped back from the bridge 2, the transmission source Mac address to transmission destination port correspondence table 1340 already has one registered. If the received packet is not one registered, it is judged that the received packet is not one looped back from the bridge 2. As a result, the received packet is transmitted to the port 1310 (S24).

In the step of checking for the aging time of the corresponding entry (S22), it is checked whether the received packet is one looped back from the bridge 2 or whether the dependency of the terminal which transmitted a received packet has been changed from the bridge 1 to the bridge 2 (S22). However, when the packet is looped back, the aging time becomes extremely short, compared with that in the terminal changing operation. Hence when the interval between a transmission time and a receiving time becomes more than a reference value $\Delta t$, it is judged that the received packet is the packet produced in the terminal switching operation, not the packet looped back from the bridge 1, so that the step of deleting the corresponding entry and the step transmitting the packet to the port 1310 are executed. When the aging time is less than $\Delta t$, the received packet is judged to be one looped back from the bridge 1, thus being discarded.

The aging time $\Delta t$ is set to a value larger the possible time during which the received packet is looped back from the bridge 1 but smaller than the lifetime for which the bridge table in the learning bridge section exists. Specifically, the aging time ranges from several seconds to the lifetime of the bridge table. The table maintenance module 1350 deletes entries of which the lifetime exceeds, by periodically referring to the transmission source Mac address to transmission destination port correspondence table 1340.

In the above-mentioned embodiment, the transmission source Mac address to transmission destination port correspondence table 1340 is formed on a CAM (Content-Addressable memory) or DRAM and are searched in hardware or software. The aging time Δt in the step S22 shown in FIG. 7 is, for example, 10 seconds. The bridge table lifetime by default is 300 seconds according to the IEEE standard. The lifetime of the table 1340 is set to a value larger than that of the bridge table lifetime, for example, 400 seconds. The network port is, for example, an Eternet port or Fast Eternet port.

Figure 4B:
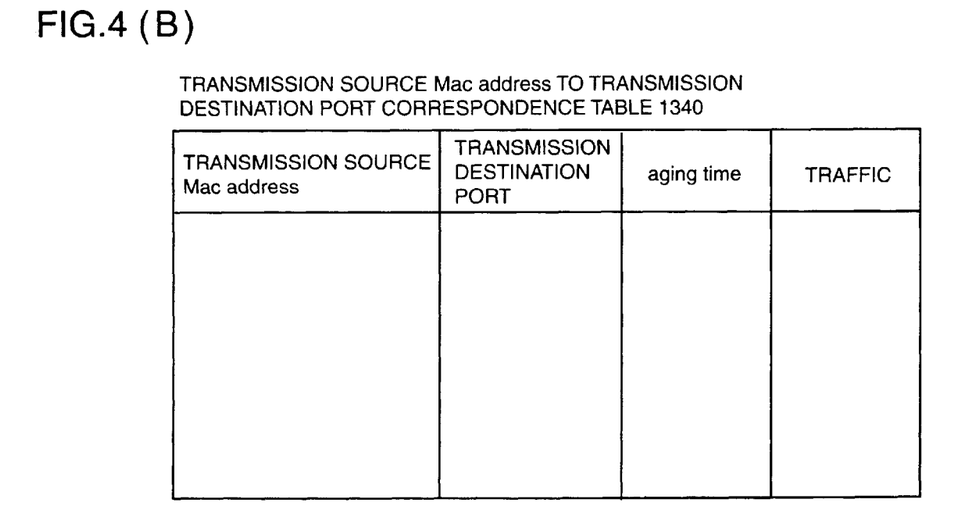
FIG. 4(B) shows a transmission source Mac address to transmission destination port correspondence table.

In another embodiment of the present invention, the transmission source Mac address to transmission destination port correspondence table further includes a parameter of traffic, as shown in FIG. 4(B). The traffic is, for example, hit counts per time, which allows the busy condition of a network involved in each terminal to be judged.

In the first embodiment of the present invention, the line state is judged using the MIB information to match the transmission source Mac address with the transmission destination port. In the second embodiment, the transmission source Mac address and a transmission destination port can be changed in a line busy state by judging the busy condition of each terminal.

As described above, the present invention has the advantage of capable of effectively using plural paths in a connection state at high transmission rate because all the paths established between the bridge of the present invention and other bridge are used.

Moreover, the present invention can reserve the redundancy of a network by the spanning tree because only the port which passes a spanning tree protocol can be decided among ports corresponding to plural paths.

The entire disclosure of Japanese Patent Application No. 9-160717 filed on Jun. 18, 1998 including specification, claims, drawing and summary are incorporated herein by reference in its entirety.

What is claimed is:

1. A bridge which configures a spanning tree and is connected to neighbor bridges via plural paths, comprising:
   a storage table for storing a pair of a transmission source address of a receive packet and a transmission destination port of said packet;
   a transmission destination decision registering means for deciding said transmission destination port by the transmission source address of said receive packet and then registering said transmission destination port on said storage table; and
   a transmission packet dividing means for transmitting packets from a specific port among ports corresponding to said plural paths when packets to be transmitted to said plural paths are broadcast packets or BPDU (Bridge Protocol Data Unit) packets of said spanning tree and for referring to said storage table when said packets to be transmitted to said plural paths are not broadcast packets or BPDU packets and then transmitting said packets to a corresponding transmission destination port.

2. The bridge defined claim 1, wherein said transmission source address on said storage table stores aging time information representing a registration elapse time; and wherein said transmission source port on said storage table stores aging time information representing a registration elapse time; and wherein said transmission packet dividing means resets corresponding aging time information upon referring to said storage table.

3. The bridge defined claim 1, further comprising received packet dividing means for receiving a BPDU packet and a broadcast packet and then transmitting them to the next stage, said BPDU packet and said broadcast packet being transmitted from said specific port among said ports respectively corresponding to said paths.

4. The bridge defined claim 2, further comprising received packet dividing means for receiving a BPDU packet and a broadcast packet and then transmitting them to the next stage, said BPDU packet and said broadcast packet being transmitted from said specific port among said ports respectively corresponding to said paths.

5. The bridge defined claim 1, wherein said received packet dividing means refers to said storage table according to said transmission destination address of said received packet from a port corresponding to each of said paths and then discards said received packet when said corresponding transmission destination port differs from a receive port.

6. The bridge defined claim 2, wherein said received packet dividing means refers to said storage table according to said transmission destination address of said received packet from a port corresponding to each of said paths and then discards said received packet when said corresponding transmission destination port differs from a receive port.

7. The bridge defined claim 3, wherein said received packet dividing means refers to said storage table according to said transmission destination address of said received packet from a port corresponding to each of said paths and then discards said received packet when said corresponding transmission destination port differs from a receive port.

8. The bridge defined claim 2, wherein said received packet dividing means refers to said storage table according to said transmission destination address of said received packet from a port corresponding to each of said paths and then discards said received packet when said corresponding transmission destination port is the same as a receive port and said transmission source address is registered on said storage table and information on said corresponding aging time registered on said storage table is smaller than a predetermined time.

9. The bridge defined claim 3, wherein said received packet dividing means refers to said storage table according to said transmission destination address of said received packet from a port corresponding to each of said paths and then discards said received packet when said corresponding transmission destination port is the same as a receive port and said transmission source address is registered on said storage table and information on said corresponding aging time registered on said storage table is smaller than a predetermined time.

10. The bridge defined claim 4, wherein said received packet dividing means refers to said storage table according to said transmission destination address of said received packet from a port corresponding to each of said paths and then discards said received packet when said corresponding transmission destination port is the same as a receive port and said transmission source address is registered on said storage table and information on said corresponding aging time registered on said storage table is smaller than a predetermined time.

11. A method of improving the efficiency of a bridge which configures a spanning tree and is connected to neighbor bridges via plural paths, comprising the steps of:

storing a pair of a transmission source address of a receive packet and a transmission destination port of said packet into a storage table;

deciding said transmission destination port by the transmission source address of said receive packet and then registering said transmission destination port on said storage table; and transmitting packets from a specific port among ports corresponding to said plural paths when packets to be transmitted to said plural paths are broadcast packets or BPDU (Bridge Protocol Data Unit) packets of said spanning tree and for referring to said storage table when said packets to be transmitted to said plural paths are not broadcast packets or BPDU packets and then transmitting said packets to a corresponding transmission destination port.

\* \* \* \* \*